United States Patent [19]

Turpin et al.

[11] Patent Number: 5,062,153
[45] Date of Patent: Oct. 29, 1991

[54] READING DEVICE OF POLARIMETRIC AND INTERFEROMETRIC SENSORS

[75] Inventors: Marc Turpin, Bures sur Yvette; Philippe Refregier, Palaiseau, both of France

[73] Assignee: Thomson-CSF, Puteaux, France

[21] Appl. No.: 527,341

[22] Filed: May 23, 1990

[30] Foreign Application Priority Data

May 23, 1989 [FR] France .................. 89 06717

[51] Int. Cl.$^5$ .............................................. H04B 10/00
[52] U.S. Cl. .............................. 359/156; 250/227.17; 250/227.19; 385/15
[58] Field of Search ............... 455/612, 616, 610; 370/2; 250/227.17, 227.19, 227.27; 350/96.15, 370, 407; 356/345, 365

[56] References Cited

U.S. PATENT DOCUMENTS

| | | | |
|---|---|---|---|
| 4,536,088 | 8/1985 | Rashleigh et al. | 250/227.19 |
| 4,659,923 | 4/1987 | Hicks, Jr. | 250/227.19 |
| 4,830,449 | 5/1989 | Spillman, Jr. | 250/227.17 |
| 4,840,481 | 6/1989 | Spillman, Jr. | 250/227.17 |

FOREIGN PATENT DOCUMENTS 0326475  8/1989  European Pat. Off. ....... 250/227.17

Primary Examiner—Reinhard J. Eisenzopf
Assistant Examiner—Kinfe-Michael Negash
Attorney, Agent, or Firm—Oblon, Spivak, McClelland, Maier & Neustadt

[57] ABSTRACT

A reading device of interferometric or polarimetric sensors including a main fiber on which a number of couplers equal to the number of sensors are placed, each coupler connected to a secondary compensation fiber, followed by a polarizer and a detector, thus constituting n elementary polarimeters.

20 Claims, 2 Drawing Sheets

READING DEVICE OF POLARIMETRIC AND INTERFEROMETRIC SENSORS

BACKGROUND OF THE INVENTION

1. Field of the Invention

The present invention relates to a reading device of polarimetric and interferometric sensors.

2. Discussion of the Background

To decode data coming from a network of coherence multiplexed sensors, it is necessary to compensate the phase shifts with an interferometric reading device. Depending on the structure of the sensor network, optical fiber Mach-Zehnder type interferometers or Michelson type interferometers are used. In the particular case of low coherence multiplexing, it is difficult to use non-birefringent optical fibers considering the precision required for the adjustment of the length of the fiber sections used in the Mach-Zehnder type passive interferometers. In the general case, the Michelson interferometer is widely used in the laboratory considering its great versatility and its ease of use. However, it is difficult to use the Michelson interferometer outside the laboratory, for example, at an industrial site, because of the fragility of the mobile mirrors of this interferometer.

The device of FIG. 1 consists of a light source 1 supplying a coherence multiplexed sensor network 2. This network is a polarimetric type multipoint monofiber network, which includes fiber F and n sensors (M0, M1, ..., Mn) positioned between polarization coupling points made on fiber F.

Network 2 is followed by a diverting fiber 3 which ends in a polarizer 4. Following polarizer 4, a reading device 5 which is, in the example shown, a Michelson type interferometer, is connected.

The n sensors of network 2 are coherence multiplexed. Interferometric reading device 5 is used to compensate for the delays or phase shifts due to the various sensors. This device exhibits the drawbacks cited above.

SUMMARY OF THE INVENTION

Accordingly, the objects of the present invention are to provide a reading device of polarimetric and interferometric sensors which is simple to adjust and to use and which can be used in a hostile environment (industrial medium, on-board equipment ...).

These and other objects are achieved according to the present invention by providing a new improved reading device including a main optical fiber on which n polarization-preservation couplers are placed, wherein each of these couplers is connected to a compensation fiber, and each of the compensation fibers is connected to a polarizer and a detector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
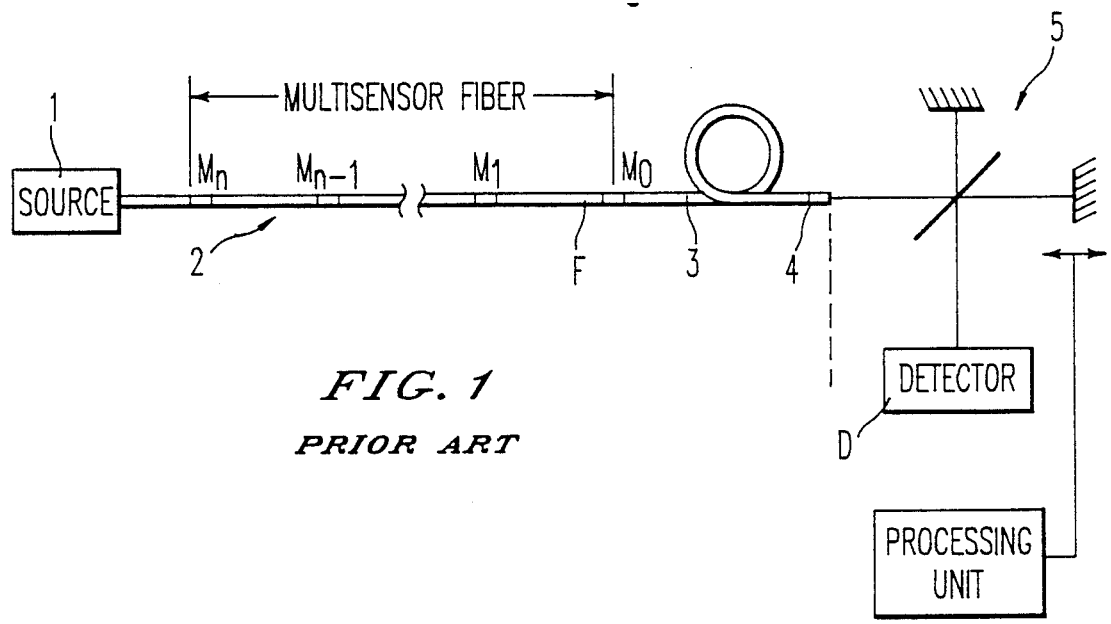
FIG. 1 is a simplified diagram of a conventional reading device of sensors.
Figure 2:
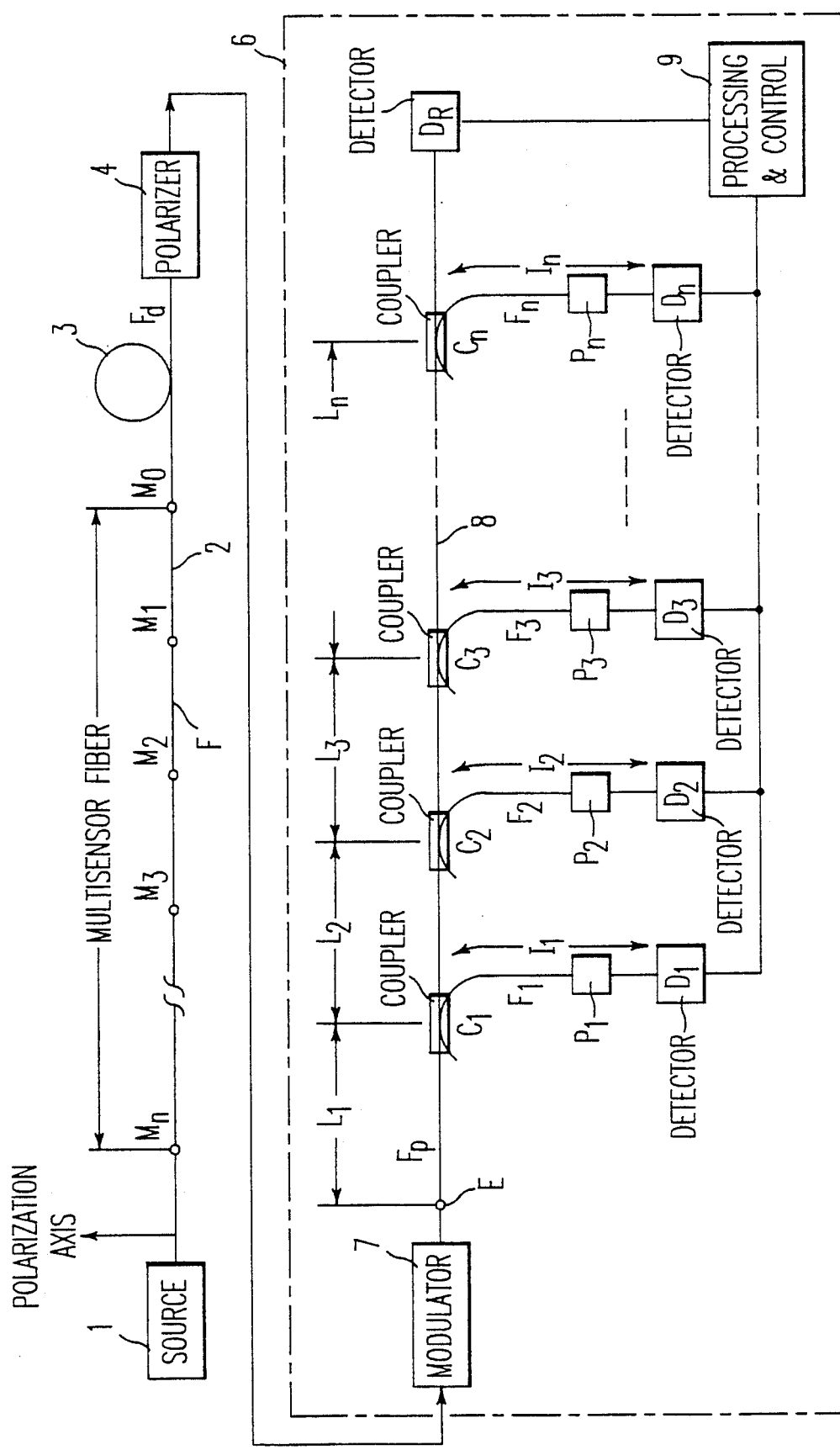
FIG. 2 is a schematic diagram of a reading device according to the present invention.

Referring now to the drawings, wherein like reference numerals designate identical or corresponding parts throughout the several views, and more particularly to FIG. 2 thereof, there is shown in schematic form the reading device of the present invention, the elements 1 to 3 as illustrated in FIG. 1. Diverting fiber 3 is connected to reading device 6 described in detail below, a TE/TM polarization modulator 7 being inserted in a suitable location of fiber 3. This modulator 7, advantageously constructed of integrated optics, assures the passive homodyning of the signal coming from the sensors.

Reading device 6 includes a main fiber 8 which is connected to the end of fiber 3 through polarizer 4 and modulator 7. Fiber 8 is a polarization-preservation birefringent monomode optical fiber. Couplers Cl to Cn (n being the number of sensors of network 2) are placed on fiber 8. Thus, from input E of fiber 8, there are n successive sections delimited by the couplers, with respective lengths Ll, L2,...Ln. The length of fiber 8 beyond coupler Cn is of any suitable length. Couplers Cl to Cn are monomode couplers with polarization-preservation of the incident waves. Each of these couplers Cl to Cn takes a portion of the energy reaching fiber 8, and couples it to one of n secondary optical fibers, Fl to Fn respectively. These secondary fibers also are monomode, birefringent with polarization preservation, their respective lengths being 11 to ln. Polarizing devices, Pl to Pn respectively, and detectors, D1 to Dn respectively, are connected to the respective ends of each secondary fiber Fl to Fn. These n detectors can be separate or can be formed as a part of a single connected strip of detectors. At the end of fiber 8 opposite to input E, a detector Dr is connected which provides a reference value used in the manner explained below. All detectors D1 to Dn and Dr are connected to a central processing device 9, which assures the functions of quick sequential addressing of the detectors and of counting-up/counting-down of the interference fringes.

Reading device 6 thus includes n polarimeters formed by a secondary fiber Fi with its polarizer Pi and its detector Di, the main fiber sections being located upstream from corresponding coupler Ci (i going from 1 to n): the first polarimeter comprises Ll and Fl, the second Ll+L2 and F2 ... and the last one sections Ll to Ln and Fn.

Sensor network 2 (FIGS. 1 and 2), of polarimetric or interferometric type, is coherence addressed preferably with low coherence. The signal coming from network 2 is in the form of a discrete sequence of decorrelated secondary wave trains, and a main wave train. The main wave train emitted by light source 1, for example, if the addressing is performed with low coherence, has a coherence length between 20 and 100 microns, approximately. This main wave train is inputted into birefringent fiber F with a linear polarization parallel to one of the characteristic axes (quick axis, for example) of fiber F, and is propagated therethrough without disturbance. At each polarization coupling point at which sensors Mn to M0 are located, a fraction (for example, several $10^{-3}$ to several $10^{-2}$ of the energy propagating in fiber F is transferred from said characteristic axis (quick axis) to the other characteristic axis (slow axis, for example), which is orthogonal to the quick axis. The propagation speed of the energy thus coupled consequently is modified (slowed, for the coupling to the slow axis). At the output of fiber F, the main wave train is in the same polarization state as at the input to fiber F, and the secondary wave trains, corresponding to the coupling points, are in the crossed polarization state. To divert the output data of fiber F, which is coded by the various successive couplings from one axis to the orthogonal axis, to the reading device, birefringent fiber 3 is used, oriented at 45° relative to fiber F. This fiber 3 makes it possible to transport on each of its polarization axes all the data provided by fiber F (main wave train and secondary wave trains). In the prior art device of FIG. 1, one of the polarizations is selected with polarizer 4 (standard or with optical fiber). In the device of the present invention (FIG. 2), this selection is made downstream, at the end of each secondary fiber (polarizers P1 to Pn).

In reading device 6 of the present invention, the unit of the wave trains (main and secondary) coming from fiber 3 is coupled at 45° to the characteristic axes of main fiber 8, the secondary wave trains propagating there at a speed different from that of the main wave train.

Figure 3:
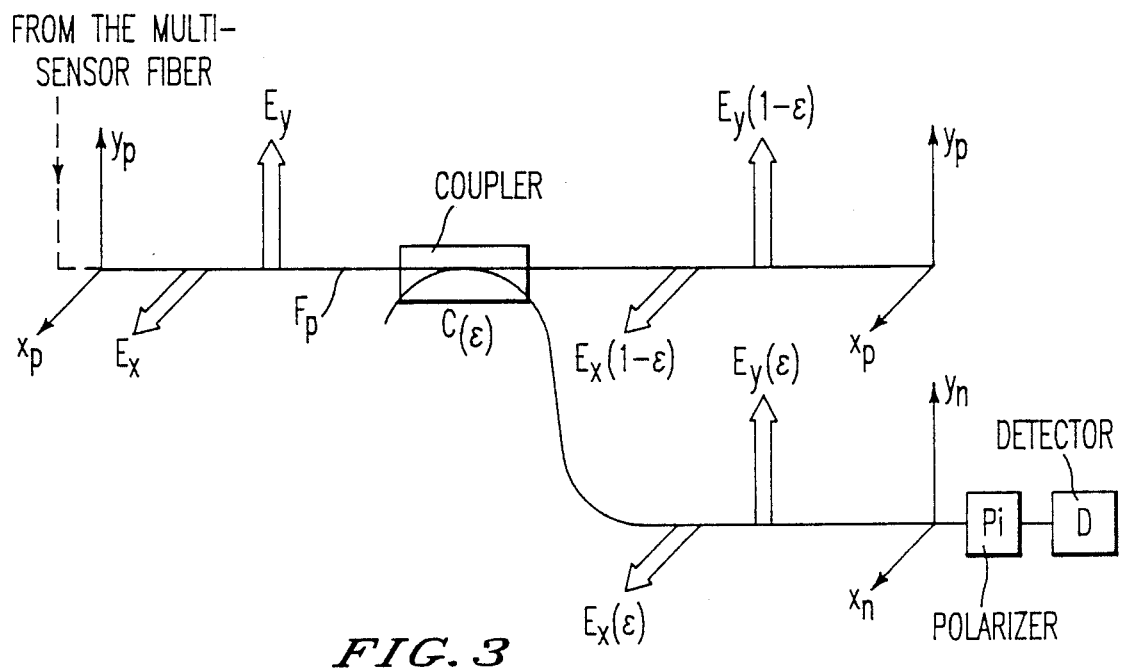
FIG. 3 is an explanatory diagram of the operation of an elementary polarimeter of the device of FIG. 2.

At each coupler Ci encountered, the polarization states are preserved on main fiber 8 and on the corresponding secondary fiber Fi, as shown in FIG. 3. The phase shifts therefore are cumulative along main fiber 8 and along secondary fibers F1 to Fn. Thus, the phase shift corresponding to the last section (between M1 and Mo) of sensor fiber F is compensated by first section (L1) of main fiber 8 and first secondary fiber F1, and so forth.

The equations which correlate the various delays in fiber F to the corresponding compensations of reading device 6 are written:

| Sensors | Compensation fibers |
|---|---|
| nth (M1; MO) | L1 + F1 |
| nth and (n − 1)th (M2; Mo) | L1 + L2 + F2 |
| . | . |
| . | . |
| . | . |
| nth and (n − 1)th and 1st (Mn; Mo) | L1 + L2 + ... + Ln + Fn |

The values for each of the sensors are obtained by differencing.

To compensate the various delays correctly, it is necessary to adjust the compensation fiber lengths (to obtain the equality of the optical paths). It is recalled that in a birefringent fiber polarimeter, a phase shift of 2n corresponds not to the wavelength of the source but to the beat length. The beat length typically is several millimeters for the normal polarization-preservation fibers. Thus, the fiber lengths (of the main fiber and secondary fibers) should be adjusted to depolarization length Ld, which is a function of the coherence length of the light source and of the birefringence of the optical fibers. In this case, the length Ld is several centimeters, which simplifies the adjustment of the necessary fiber lengths.

The reading device of the present invention can be used independent of the wavelength of the light source used (usually 0.84 or 1.3 microns), with low coherence lengths (for example, between 20 and 100 microns, approximately, as specified above).

The reading device of the present invention is totally compatible with integrated optical elements (of lithium niobate, for example), due to the monomode nature of the fibers used.

Additional detector Dr, placed at the downstream end of fiber 8, is advantageously used to control the light flux from the main wave train reaching the end of fiber 8. The value that detector Dr provides is used as a reference for the counting-up and the counting-down of the interference fringes, which are produced from variations of relative intensities VDi/VDr (VDi: value provided by the detector of row i, and VDr: value provided by Dr). Using n detectors D1 to Dn, the reading can be made in parallel with n sensors.

Obviously, numerous modifications and variations of the present invention are possible in light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE U.S. IS:

1. A reading device of a plurality of sensors, said sensors comprised of the polarimetric type and interferometric type, and fed by light emitted from a light source, comprising:
   a main optical fiber;
   a plurality of polarization-preservation couplers positioned on said main optical fiber;
   a plurality of compensation fibers connected to respective of said polarization-preservation couplers;
   a plurality of polarizers connected to respective of said compensation fibers; and
   a plurality of detectors connected to respective of said plurality of polarizers.

2. A device according to claim 1, further comprising:
   an additional detector connected to an end of said main optical fiber.

3. A device according to claim 1, further comprising:
   a central control and processing device, an additional detector and said plurality of detectors being connected to said central control and processing device.

4. A device according to claim 2, further comprising:
   a central control and processing device, said additional detector and said plurality of detectors being connected to said central control and processing device.

5. A device according to claim 1, wherein the compensation fibers comprise polarization-preservation birefringent monomode fibers.

6. A device according to claim 3, wherein the compensation fibers comprise polarization-preservation birefringent monomode fibers.

7. A device according to claim 4, wherein the compensation fibers comprise polarization-preservation birefringent monomode fibers.

8. A device according to claim 1, wherein the light source emits light having low coherence.

9. A device according to claim 7, wherein the light source emits light having low coherence.

10. A device according to claim 1, wherein the compensation fibers comprise fibers having a length equal to a depolarization length, said depolarization length being a function of coherence length of the light emitted by the light source and of birefringence of the compensation fibers.

11. A device according to claim 4, wherein the compensation fibers comprise fibers having a length equal to a depolarization length, said depolarization length being a function of coherence length of the light emitted by the light source and of birefringence of the compensation fibers.

12. A device according to claim 5, wherein the compensation fibers further comprise fibers having a length equal to a depolarization length, said depolarization length being a function of coherence length of the light emitted by the light source and of birefringence of the compensation fibers.

13. A device according to claim 9, wherein the compensation fibers further comprise fibers having a length equal to a depolarization length, said depolarization length being a function of coherence length of the light emitted by the light source and of birefringence of the compensation fibers.

14. A device according to claim 1, further comprising:
a polarization modulator positioned at a light-entering end of said main optical fiber.

15. A device according to claim 4, further comprising:
a polarization modulator positioned at a light-entering end of said main optical fiber.

16. A device according to claim 13,, further comprising:
a polarization modulator positioned at a light entering end of said main optical fiber.

17. A device according to claim 4, wherein the central control and processing device comprises means for sequential addressing of the detectors and counting-up/counting-down of the interference fringes.

18. A device according to claim 16, wherein the central control and processing device comprises means for sequential addressing of the detectors and counting-up/counting-down of the interference fringes.

19. A device according to claim 17, wherein the means for counting-up and counting-down of interference fringes further comprises means for determining variations of a ratio of relative intensities provided by the detectors connected to the compensation fibers to an intensity of a signal provided by the additional detector.

20. A device according to claim 18, wherein the means for counting-up and counting-down of interference fringes further comprises means for determining from variations of a ratio of relative intensities provided by the detectors connected to the compensation fibers to an intensity of a signal provided by the additional detector.

* * * * *